April 3, 1934.　　A. A. STILLGER ET AL　　1,953,372
COOLING TOWER
Filed Jan. 20, 1932　　3 Sheets-Sheet 1
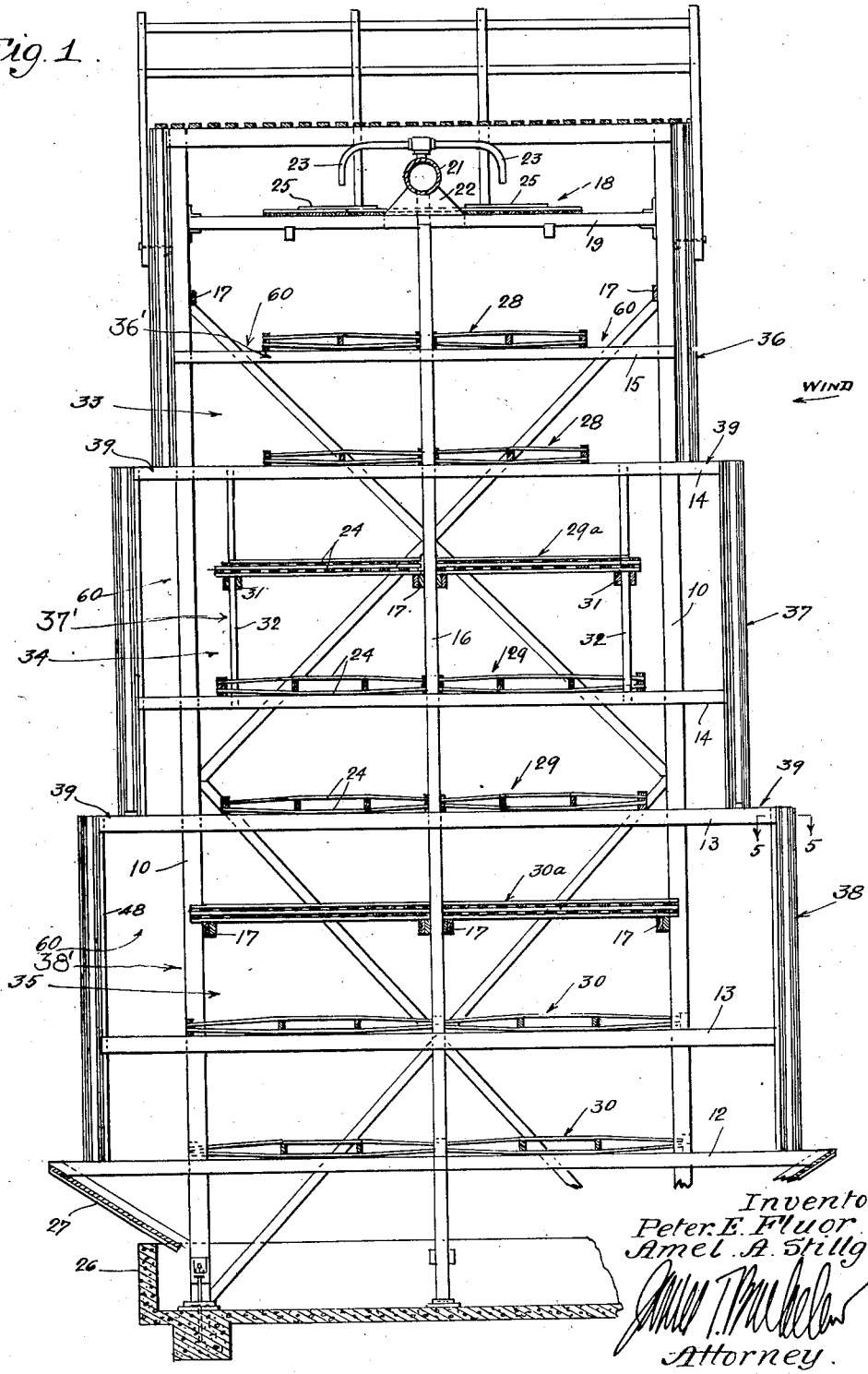

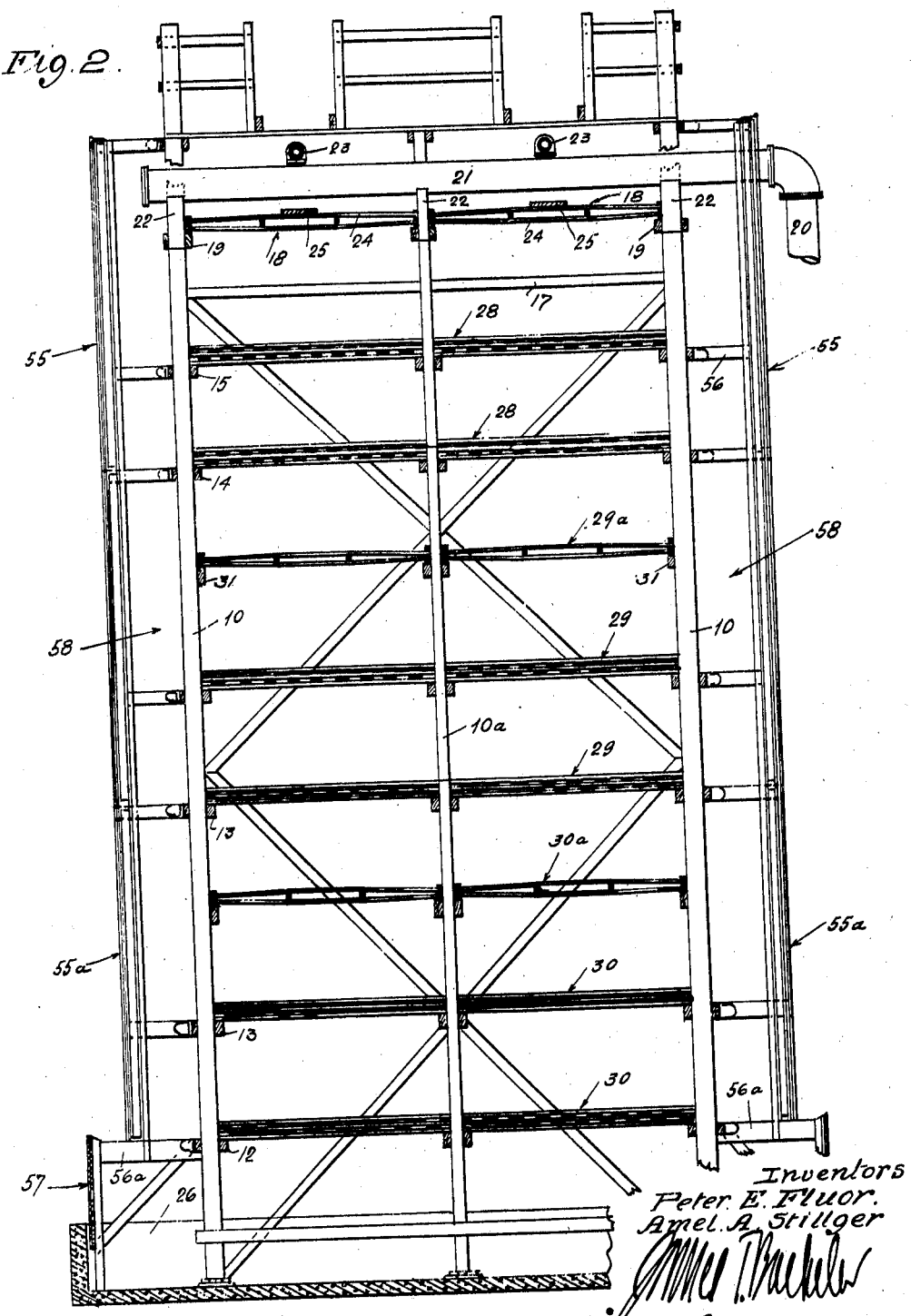

April 3, 1934.  A. A. STILLGER ET AL  1,953,372
COOLING TOWER
Filed Jan. 20, 1932    3 Sheets-Sheet 3
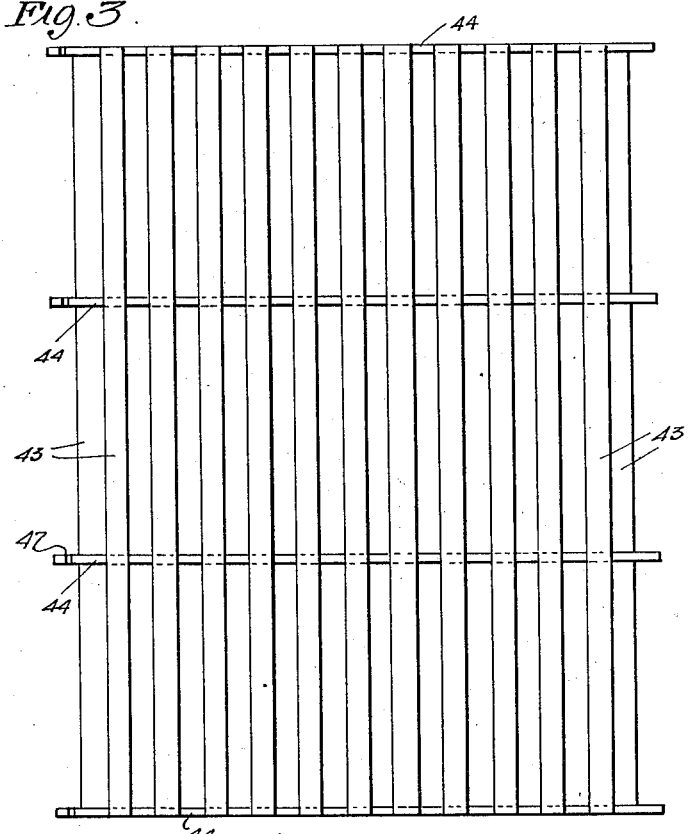
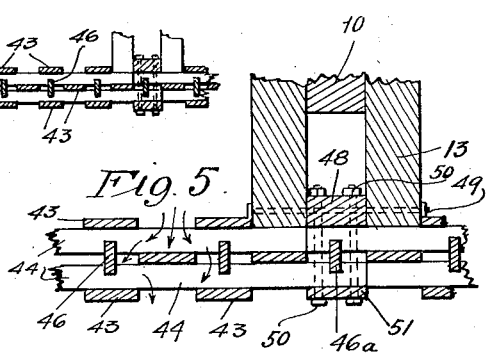
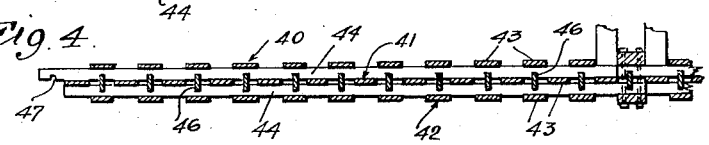
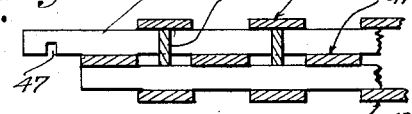
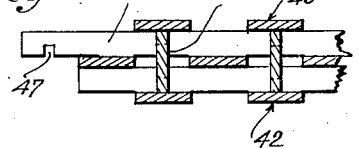
Inventors
Peter E. Fluor
Amel A. Stillger
Attorney.

Patented Apr. 3, 1934

1,953,372

UNITED STATES PATENT OFFICE 1,953,372

COOLING TOWER

Amel A. Stillger and Peter E. Fluor, Los Angeles, Calif., assignors to The Fluor Corporation, Ltd., Los Angeles, Calif., a corporation of California Application January 20, 1932, Serial No. 587,710

19 Claims. (Cl. 261—113)

This invention has reference to atmospheric cooling towers in which the water to be cooled is passed downwardly through the tower in a state of fine division and in thorough exposure to transversely flowing air currents. The general purpose of the invention is to accomplish more efficient cooling and saving of the water than heretofore has been possible in conventional cooling towers, by enabling the down-flowing water to become aerated to the greatest possible extent without appreciable loss of water through its becoming carried out of the tower by the air currents.

In order that the water may become cooled most efficiently and to the lowest possible temperature, it is essential that certain conditions be maintained. And of these conditions, those most largely responsible for efficient cooling, are first, the maintenance of the water in finely divided condition and thorough exposure for the necessary amount of time, and second, the aeration of the finely divided water particles with all the available air currents that may be allowed to pass transversely through the tower. It is with the view of rendering the tower most effective with reference to this latter consideration, namely that of aerating the water to the greatest possible extent, that the invention is primarily concerned.

Ordinarily, for the purpose of securing the desired fine state of division and exposure of the water during its downward course through the tower, the latter is provided with a series of vertically spaced apertured decks, over which the water flows in thin films, and from which the water is showered downwardly to the deck next below. Outside of certain departures from the usual deck arrangement, contemplated by the invention and hereinafter described in detail, we preferably use vertically spaced apertured or slatted decks similar in construction and arrangement to certain types in common use. It is to be understood however that in its broad aspects, the invention is not to be regarded as necessarily limited to the provision of one or any particular means for maintaining the water in finely divided condition as it passes down through the tower.

Theoretically, where the time of exposure to the air and the state of division of the water are the same, the most efficient cooling would be had by subjecting the water to open exposure to the air, as distinguished from exposing it to the air in a tower which, to some extent at least, is enclosed. In the past this condition has been maintained in the spray pond types of water coolers, in which the water is discharged in a more or less fine spray into the open atmosphere and permitted to fall into the collecting pond. One main objection to this means for cooling water lies in the excessive water loss due to the spray becoming carried away by wind or air currents. In view of this objection, common practice has been to resort to cooling towers through which the flow of air is permitted, but in which a water loss is reduced by enclosing the tower by a vertical series of louvers, the latter consisting of spaced downwardly and inwardly inclined baffles between which the air may pass.

While the inclined louvers permit more or less free passage of wind through the tower, and to a great extent reduce the water loss by reason of the fact that the moisture carrying air currents are caused to be deflected upwardly between the louvers upon leaving the tower, the objection still remains that, particularly at times of high wind velocity, the inclined spaced louvers do not reduce water losses to the extent required for most economic operations. This is due primarily to the fact that while the inclined louvers do to a certain extent present deflecting barriers or baffles against which the air currents impinge as they leave the tower, still the open spaces between louvers, permit the air currents to pass out of the tower without having been caused to follow such a tortuous path that the entrained water particles would become separated.

In accordance with the invention we have provided a cooling tower embodying such improvements as will permit free passage of transversely flowing air through the tower, and prevent any water loss of consequence, by reason of the air currents being required, upon leaving the tower, to follow such tortuous paths that substantially all the moisture particles carried in the air currents will be kept within the tower. A further feature of the invention resides in a novel deck arrangement so designed as to allow the most effective circulation of air currents within the tower, and to allow the escape of heated air at such points as will contribute further to more efficient cooling. The invention further contemplates the provision of a particular type of improved baffle having the effect of allowing free passage of air therethrough, but requiring the air to take such paths as will result in separation and precipitation of entrained moisture that the air may carry.

Further objects of the invention as well as the structural characteristics and details of a typical and preferred embodiment thereof, will be explained to best advantage in the description to follow. Reference is had for purposes of description to the accompanying drawings in which:

Fig. 1 is a transverse vertical sectional view of a cooling tower embodying the invention;

Fig. 2 is a longitudinal sectional view of the tower;

Fig. 3 is an enlarged view showing one of the baffles in elevation;

Fig. 4 is a transverse sectional view of the baffle showing one end of the latter connected to the transchords of the tower frame;

Fig. 5 is a fragmentary enlarged section on line 5—5 of Fig. 1, showing the joint between the baffles and the horiontal frame members; and Figs. 6 and 7 are fragmentary enlarged sectional views showing the variational forms of baffles.

In Figs. 1 and 2, the cooling tower frame is shown to comprise a plurality of posts 10 arranged in pairs at the longitudinal ends of the tower, and intermediate posts 10a placed midway between the others. It may be stated that while for purposes of illustration we have shown a tower made up of two longitudinal sections, these sections individually extending from posts 10 to posts 10a, the tower may be built of any suitable length and of any desired number of sections. Extending transversely between the vertical posts is a series of horiozntal members or chords 12, 13, 14 and 15, these being of progressively shorter lengths in the order named, for purposes that will later appear. Between each pair of columns 10 and 10a are erected the intermediate deck supporting columns 16, see Fig. 1, these being spaced longitudinally of the tower in accordance with the spacing of columns 10 and 10a in that direction. Chords 17 extend longitudinally of the tower to connect the columns.

Distributing decks 18 are supported on transchords 19 at the upper end of the tower, these decks serving to distribute the water discharged thereon, transversely of the interior of the tower. Water to be cooled is pumped through the pipe 20, extending down to the ground surface, to a main flume or header 21 extending centrally and longitudinally of the tower at its top, this header resting on suitable supports 22. The water flows from the header through downwardly discharging branch pipes 23 spaced at intervals corresponding to the longitudinal sections of the tower. Distributing decks 18 may be of any suitable construction, and are shown typically as being made up of a plurality of strips 24 in vertically spaced and relatively staggered relationship, this type of deck being well known to those familiar with the art. Splash boards 25 are placed on the distributing decks directly beneath the ends of branch pipes 23 in order to spread the water being discharged, and to prevent the same passing directly through the deck.

The columns of the frame have footings within a basin 26, which may be of concrete, wood or steel, within which the water is collected after having been cooled in its downward flow through the tower. Collector boards or panels 27 are secured to the ends of the lowermost transchords 12, these collector panels extending downwardly and inwardly to points within the basin. Since in its transverse dimension the lower part of the tower is somewhat wider than the basin, the collector panels 27 are provided for the purpose of gathering into the basin whatever water that may drain to the bottom of the lowermost baffles, hereinafter described, or that may deposit at the bottom of the air space at the inside of these baffles.

A series of vertically spaced horizontal decks 28, 29 and 30 are supported on the transchords, as illustrated, with the exception of deck 29a which rests on longitudinally extending supports 31 attached to vertical members 32 extending between transchords 14, the inner end of decks 29a resting on longitudinal chords 17. The decks 28, 29, 29a and 30 are of similar and well known construction, being made up as in the case of the distributing deck, of a plurality of spaced slats 24 arranged in relatively staggered positions.

It will be noted that the decks are arranged in three vertical groups generally indicated at 33, 34 and 35, and that the widths of the decks in these groups increase in downward progression. The reason for so arranging the decks may be expressed to best advantage at a later point. We may mention now however that each group may comprise any suitable number of decks, and that, in accordance with the height of the tower, there may be any suitable number of groups in which the decks are of corresponding width. Preferably, and as illustrated, certain of the decks, for example 29a and the uppermost of decks 30, will be arranged so that the strips 24 thereof extend longitudinally instead of transversely of the tower, the purpose of this being to effect even distribution of the water longitudinally as well as transversely of the tower.

As regards the course taken by the water in its passage through the tower, it may be stated that the water discharged from the main header onto the distributing decks, is showered downwardly to the deck 28 next below and thence similarly through the entire series of decks to be finally collected in the basin. As will readily appear, by virtue of their slatted construction, the decks serve to effect thorough surface exposure of the water in passing over them, and to effectively break up the water to the extent that the water is maintained in a state of more or less fine division.

The outside walls of the tower are formed by a vertical series of baffles 36, 37 and 38, extending in substantially vertical and relatively offset planes whereby they define the sides of cooling zones 36', 37', and 38', respectively of progressively increased size. By virtue of the offset positions of the baffles, spaces are provided at 39 at their adjacent upper and lower ends, through which the heated air currents within the tower may rise and escape into the atmosphere. It is to be understood that in the broad aspects of the invention, these relatively offset baffles may be of any suitable construction. Preferably they are made up in such a manner as to permit comparatively free passage of air therethrough, but at the same time to cause the air to follow such tortuous paths that any moisture particles carried in the air will be deposited on the impinging surfaces of the baffle.

In Figs. 3 to 7, inclusive, we have shown certain typical and preferred forms of baffle construction which have been found particularly effective to serve the purpose stated. Referring first to Figs. 3 and 4 one form of baffle is shown to comprise three substantially parallel and spaced rows 40, 41 and 42 of battens 43, these battens extending vertically of the baffle and being arranged in relatively staggered positions with the battens in the outside rows 40 and 42 arranged in corresponding positions transversely of the baffle, and the intermediate battens in row 41 placed relatively between those in the outside rows in order to obstruct the straight passage of air through the baffle.

The battens are nailed to horizontally extending rails 44, the latter serving to maintain the battens in predetermined spaced relationship. As will be noted in Figs. 4 and 5, one of each pair of members 44 projects beyond one end of the baffle proper, the other rail projecting similarly at the other end of the baffle. The inner edges of rails 44 are notched at intervals corresponding to the spacing of battens 43 in the outside rows, and into the notches are fitted deflector strips 46, these deflector strips extending in transverse planes at right angles to the planes of the rows of battens. The advantage gained by the provision of the deflector strips, in addition to the staggered battens, is to substantially increase the baffling surface against which the air currents are brought to impinge, and to make more tortuous the path which the currents are required to take in passing through the baffle. As indicated by the arrows in Fig. 5, air currents passing from within the tower between the innermost battens, first strike the battens in the intermediate row 41, being thence deflected to impinge against the deflector strips and then being deflected by the latter in a reverse direction before passing between the battens in the outer row. Thus the air passing between any two battens of an outside row cannot pass diagonally through the baffle and out of the space between a non-corresponding pair of battens in the other outside row, but in each instance the currents are required to leave the baffle through an opening directly opposite that through which they enter. The result is that the currents are subjected to such impinging action on the battens and deflector strips, and are caused to so reverse their flow in passing through the baffle, that any moisture particles carried by the air will be deposited on the baffle surfaces and caused to drain to the bottom thereof.

The mounting of the baffles is shown more clearly in Fig. 5. In erecting the baffles on the tower, they are placed end to end, and in order to lock together the adjacent ends of the baffles, the projecting ends of rails 44 are arranged in overlapping positions so as to permit the insertion of a locking deflector strip 46a in the notches 47 that are brought into opposing positions. The baffles are attached to the outer ends of the frame transchords, the latter being attached in pairs to opposite sides of the columns 10 and projecting beyond the posts. Vertically extending members 48 are placed between the outer ends of the transchords and are held in place by bolts 49. In mounting the baffles on the outer ends of the transchords, the overlapping ends of the baffles are placed opposite members 48, and the baffles are attached thereto by means of bolts 50 extending through cleats 51 placed at the outside of the baffles.

Baffles 37 and 36 are similarly attached to transchords 14 and 15, respectively, the latter projecting sufficiently beyond the post to permit attachment of the baffles thereto. It will be noted that by virtue of the offset positions of the baffles, the latter not only are supported by their connections with the transchords as described, but are also supported by their resting on the projecting ends of the transchords below.

The variational forms of baffle construction shown in Figs. 6 and 7 are generally similar to that of Fig. 5, except as to certain changes with respect to the deflector strips. Thus in Fig. 6 deflector strips 53 are shown to extend entirely across the space between batten rows 40 and 41 but not to extend through the space at the opposite side of the intermediate row. Here both the deflector strips and spacers 44 are notched to permit the deflector strips to fit against the battens in the outer row. In Fig. 7 the deflector strips 54 are shown to extend the full width of the space between the outer rows of battens, thereby excluding any possibility of cross flow between the batten spaces.

The baffle arrangement at the ends of the tower, see Fig. 2, differs from that at the sides, in that the baffles preferably are mounted in the same plane. It will be understood that if desired the baffles may be mounted at the ends of the tower in the offset positions illustrated in Fig. 1, but generally it will be preferred to arrange the baffles at the ends in a single vertical plane. This is desired, among other reasons, in view of the fact that prevailing winds ordinarily will be toward the side of the tower, and for the further reason that by mounting the baffles at the ends of the tower as illustrated, the addition of longitudinal sections to the tower is facilitated.

The baffles 55 shown in Fig. 2 at the ends of the tower, may be similar in construction to the previously described forms and are mounted on brackets 56 projecting from the frame posts, in a manner similar to the mounting of the side baffles on the ends of the transchords. The lowermost baffles 55a rest on horizontally extending members 56a which connect the vertical walls 57 at the ends of the inclined panels 27, with the frame columns. The end louvers 55 preferably are spaced from the ends of the decks, a sufficient distance to provide vertically extending air circulation spaces at 58 through which the heated air currents within the tower may rise. Whereas the decks are made different widths, corresponding to the spacings of side baffles, the decks are of corresponding lengths, as shown in Fig. 2 extending in each case to the side columns. The width, that is the distance from the baffles 55 from post 10, of the air spaces 58, is uniform throughout the height of the tower.

The paths taken by the air currents passing transversely through the tower, and the effectiveness of the baffles in causing precipitation of air-entrained moisture at the leeward side of the tower, may be explained best with reference to Fig. 1. The windward side of the tower may be assumed to be at the right, with the wind blowing toward the tower in the direction indicated by the arrows. By virtue of their slatted construction, the baffles permit air currents to pass freely through them into the tower, and due to the effect of the baffle arrangement, a comparatively small proportion of the entering air may pass through the spaces at 39.

In cooling towers having the customary arrangement of solid louvers, all the air enters through the spaces between the louvers. And even though the usual louvers be apertured to permit the flow of air therethrough it still remains that at least as much air will enter the tower through the spaces between the louvers, as will pass through them, because of the deflecting action of the louvers. With further reference to the usual louver construction, it may be stated that ordinarily the louvers are so arranged as to slope downwardly and inwardly to the edges of the decks, and that by virtue of this arrangement the louvers have the effect of causing the entering air to sweep downwardly across the lower portions of the cooling chambers between decks at considerably higher velocity than at upper points in the chambers, with resultant tendency of the high velocity air currents to pick up excessive moisture.

In accordance with the invention, the baffles 36, 37 and 38, by virtue of their vertical and relatively offset positions, cause the air currents to flow in straight horizontal paths between the decks. Since but a comparatively small proportion of the air enters the spaces 39, there is no tendency for uniform transverse circulation between the decks to be destroyed, as is ordinarily the case where inclined louvers are used which tend to deflect the air currents in a downwardly and inwardly sweeping path. The air is permitted to flow uniformly through the cooling chambers between decks, and in fact throughout the height of the tower, with corresponding uniformity in the cooling effect on the water. By maintaining such uniform flow, a minimum amount of the downflowing water is picked up by the transversely flowing air, and the tendency existing in ordinary towers for the air to flow at certain points, principally at the surfaces of the decks, at such high velocity as to pick up excessive quantities of moisture, is completely obviated.

Upon reaching the leeward side of the tower, the air currents, carrying a certain amount of entrained moisture, pass horizontally through the baffles. As previously explained, the construction of the baffles is such that substantially all the entrained moisture particles are precipitated from the air by depositing on the baffles. The moisture so deposited drains through the bottom of the baffles and drops to the bottom of the tower. Since the baffles extend in vertical planes, it follows that in order for any of the air currents to leave the tower through the spaces at 39, they must first strike the baffles and then flow upwardly at right angles to their initial path. The moisture in the air flowing out through openings 39 is effectively precipitated within the tower by the air being required to make an abrupt change in its direction of flow. However, as in the case of the entering air, the proportion of air leaving the tower through openings 39 will be comparatively small.

Preferably the edges of the decks toward the sides of the tower will be spaced from the baffles and preferably the spaces between the edges of the decks in the three groups 33, 34 and 35, from the respective baffles opposite these groups, will be substantially equal. It may be stated that in a commercial tower, the spaces at 60 between the decks and the baffles may be in the neighborhood of two feet. The provision of the spaces at 60 is of importance in effecting more efficient cooling, in that there is a tendency for an upward draft to be set up through these spaces, acting to remove the heated air from the tower, thereby maintaining the temperatures in the cooling chambers between decks, as low as possible. In conjunction with the spaces beyond the edges of the decks, the offset baffle arrangement serves to assist in the removal of heated air from the tower, by allowing the warm rising currents to pass out off the tower through the spaces 39. The warm air thus is not required to flow the full height of the tower before being permitted to escape to the atmosphere.

For purposes of setting forth a clear explanation of the invention, we have shown one particular and preferred embodiment of the invention in a cooling tower having certain characteristics and structural features. It is to be understood however that in so doing, we do not appliedly limit the invention to the details shown and described herein. Instead, it is intended that the invention shall be interpreted as to its spirit and scope, as expressed in the appended claims.

We claim:

1. A cooling tower comprising, means for passing a downwardly flowing stream of water in intimate contact with transversely flowing air currents, and a wall at one side of the tower through which air currents are adapted to pass, said wall comprising a vertically progressing series of baffles, said baffles extending in substantially vertical and relatively offset planes, there being open spaces between the upper end of each baffle and the lower end of the baffle next above, and each baffle comprising spaced rows of battens with the battens in adjacent rows relatively staggered, and a plurality of deflector strips extending parallel with said battens at right angles therewith.

2. A cooling tower comprising, means for passing a downwardly flowing stream of water in intimate contact with transversely flowing air currents, and a wall at one side of the tower through which air currents are adapted to pass, said wall comprising a vertically progressing series of baffles, said baffles extending in substantially vertical and relatively offset planes, there being air passing spaces between baffles, and the baffles being made up of a plurality of vertically extending battens in spaced and relatively staggered arrangement, and a plurality of vertically extending deflector strips extending between and at substantially right angles with said battens.

3. A cooling tower comprising, means for passing a downwardly flowing stream of water in intimate contact with transversely flowing air currents, and a wall at one side of the tower through which air currents are adapted to pass, said wall comprising a vertically progressing series of baffles, said baffles extending in substantially vertical and relatively offset planes, one of said baffles comprising three spaced rows of battens and a plurality of deflector strips extending at right angles between and parallel with the battens of the outer ring, the plane of each baffle lying outside the plane of the baffle next above, and there being open spaces between baffles, through which heated air currents within the tower may rise.

4. In a cooling tower, a plurality of vertically spaced apertured decks, means for passing water downwardly through said decks, and a wall at one side of the tower through which air currents are adapted to pass, said wall being spaced a substantial distance from the edges of said decks to provide a passage through which air currents may rise within the tower, and said wall comprising a series of vertical offset baffles, spaced from adjacent baffles to form vertically opening air current passages, each of said baffles comprising spaced vertical strips which direct air currents passing between them in substantially horizontal paths and without substantial vertical deflection.

5. In a cooling tower, a plurality of vertically spaced apertured decks, means for passing water downwardly through said decks, and a wall at one side of the tower through which air currents are adapted to pass, said wall being spaced a substantial distance from the edges of said decks to provide a passage through which air currents may rise within the tower, and said wall comprising a series of baffles extending in substantially vertical and relatively offset planes, said baffles being made up of a plurality of substantially vertical strips in spaced and relatively staggered arrangement, air currents passing between said strips being directed in horizontal paths and without substantial vertical deflection.

6. In a cooling tower, a frame, an upper series of vertically spaced apertured decks, and a lower series of decks of substantially greater width, a substantially vertical baffle at the outside of said upper series of decks and spaced therefrom, and a substantially vertical baffle mounted at the outside of the lower series of decks and spaced therefrom, the planes of said baffles being relatively offset and an inclined collector panel mounted on said frame extending inwardly of the tower from the bottom of the last mentioned baffle.

7. In a cooling tower, a baffle comprising two substantially parallel and spaced rows of battens said battens being arranged in relatively staggered positions, spacing members extending transversely between said rows, and a plurality of deflector strips extending between said rows and substantially in parallel with the battens of each row.

8. In a cooling tower, a baffle comprising two substantially parallel and spaced rows of battens, said battens being arranged in relatively staggered positions, spacing members extending transversely between said rows, and a plurality of deflector strips extending between said rows and substantially in parallel with the battens of each row, each deflector strip extending in a transverse plane at right angles with the planes of said rows of battens and said deflector strips and spacing members having interfitting notches.

9. In a cooling tower, a baffle comprising three substantially parallel and spaced rows of battens, the battens in adjacent rows being arranged in relatively staggered positions, spacing members extending transversely between said rows, and a plurality of deflector strips extending longitudinally betwen the battens of the intermediate row, said deflector strips projecting into the spaces between said rows.

10. In a cooling tower, a baffle comprising three substantially parallel and spaced rows of battens, the battens in adjacent rows being arranged in relatively staggered positions and a plurality of deflector strips extending longitudinally between the battens of the intermediate row, said deflector strips projecting into the spaces between said rows, and a pair of rails extending at right angles with said battens and between the rows thereof, said rails being notched to receive said deflector strips.

11. In a cooling tower, a baffle comprising two substantially parallel and spaced rows of battens, said battens being arranged in relatively staggered positions, and a plurality of deflector strips extending between said rows and substantially in parallel with the battens of each row, each deflector strip extending in a transverse plane at right angles with the planes of said rows of battens, and a rail extending at right angles with said battens and between the rows thereof, said rail being notched to receive said deflector strips.

12. In a cooling tower, a frame comprising a series of vertical columns, a pair of vertically spaced transverse members projecting beyond said columns, a vertically extending member connected to the outer portions of said transverse members, and a substantially vertical baffle applied to said vertically extending member, said baffle including a pair of vertically spaced rails extending horizontally from and attached to said vertically extending members, and vertical strips extending from rail to rail.

13. In a cooling tower, a frame comprising vertical columns and a pair of vertically spaced transverse members projecting substantially equal distances from said columns at one side of the tower, a pair of vertical apertured baffles arranged side-edge to side-edge at the ends of said members, and means for connecting the adjacent edges of said baffles with the ends of the transverse frame members.

14. In an atmospheric cooling tower, means for passing water downwardly within the tower, a substantially vertical baffle comprising a series of relatively offset sections mounted at one side of the tower, the lowermost section comprising two substantially parallel and spaced rows of battens arranged in relatively staggered positions, means securing the opposite ends of the battens, and spacing members intermediate the securing means and extending transversely between said rows, and deflector strips extending between and at substantially right angles with the battens; and means for directing water draining to the bottom of said baffle, toward the interior of the tower.

15. In an atmospheric cooling tower, means for passing water downwardly within the tower, and a vertical apertured baffle mounted at one side of the tower and adapted to pass air currents into the interior thereof, the tower structure adjacent the upper end of the baffle extending horizontally in line therewith, said baffle comprising a plurality of vertical strips in relatively staggered arrangement, said strips by virtue of their vertical positions and by virtue of the horizontal disposition of the adjacent tower structure permitting air currents passing between them to maintain a horizontal path of flow when both approaching and leaving the baffle.

16. In an atmospheric cooling tower, means for passing water downwardly within the tower, and a pair of vertical apertured baffles mounted one above the other at one side of the tower and adapted to pass air currents into the interior thereof, there being a vertically opening space between the lower end of the upper baffle and the upper end of the lower baffle, each of said baffles comprising a plurality of vertical strips in relatively staggered arrangement, said strips by virtue of their vertical positions permitting air currents passing between them to maintain a horizontal path of flow when both approaching and leaving the baffle.

17. In an atmospheric cooling tower containing a plurality of vertically spaced decks, means for passing water downwardly within the tower, and a pair of vertical apertured baffles mounted one above the other at one side of the tower and adapted to pass air currents into the interior thereof, there being a vertically opening space between the lower end of the upper baffle and the upper end of the lower baffle, there being spaces between said baffles and the decks, each of said baffles comprising a plurality of vertical strips in relatively staggered arrangement, said strips by virtue of their vertical positions permitting air currents passing between them to maintain a horizontal path of flow when both approaching and leaving the baffle.

18. In a cooling tower, a baffle comprising two substantially parallel rows of battens, means at the opposite ends of the battens holding the battens of each row spaced apart and the battens of one row staggered with respect to the battens of the other row, spacing members at points intermediate the ends of the battens and extending transversely between said rows, and a plurality of deflector strips extending between said rows and substantially in parallel with the battens of each row.

19. In a cooling tower, a baffle comprising two substantially parallel rows of battens, means at the opposite ends of the battens holding the battens of each row spaced apart and the battens of one row staggered with respect to the battens of the other row, and spacing members at points intermediate the ends of the battens and extending transversely between said rows.

PETER E. FLUOR.
AMEL A. STILLGER.